(12) United States Patent
Chapman

(10) Patent No.: US 6,369,118 B1
(45) Date of Patent: Apr. 9, 2002

(54) BIOCOMPATIBLE EMULSIFIER

(75) Inventor: Toby J. Chapman, Pittsburgh, PA (US)

(73) Assignee: University of Pittsburgh, Pittsburgh, PA (US)

( * ) Notice: Subject to any disclaimer, the term of this patent is extended or adjusted under 35 U.S.C. 154(b) by 0 days.

(21) Appl. No.: 09/150,455

(22) Filed: Sep. 9, 1998

(51) Int. Cl.[7] .................................................. B01F 3/08
(52) U.S. Cl. .................. 516/70; 516/915; 424/DIG. 16; 562/516; 526/911; 526/932; 514/832
(58) Field of Search ............ 516/70, 915; 424/DIG. 16; 562/516; 526/911, 932; 514/832

(56) References Cited

U.S. PATENT DOCUMENTS 4,289,872 A    9/1981  Denkewalter et al. ...... 528/328
5,633,310 A  * 5/1997  Sulser et al. ............... 524/555

OTHER PUBLICATIONS

Chapman et al., "Hydraamphiphiles: Novel Linear Dendritic Block Copolymer Surfactants," *J. Am. Chem. Soc.*, 1994, 116, 11195–11196.

Chapman et al., "Fluorinated Hydraamphiphiles: Poly(ethylene oxide)–polylysine dendrimer hybrids with multiple terminal perfluorooctanoyl groups," *Proc. Am. Chem. Soc., Div. Polym. Mat. Sci. Eng.*, 1995, 73, 275–276.

Gitsov, I. et al., "Solution and Solid–State Properties of Hybrid Linear–Dendritic Block Copolymers," *Macromolecules*, 1993, 26, 6536–6546.

Newkome, G.R. et al., "Cascade Molecules: A New Approach to Micelles. A [27]–Arborol," *J. Org. Chem.*, 1985, 50, 2003–2004.

Stevelmans, S. et al., "Synthesis, Characterization, and Guest–Host Properties of Inverted Unimolecular Dendritic Micelles," *J. Am. Chem. Soc.*, 1996, 118(31), 7398–7399 (5 pages).

Tomalia, D.A. et al., "Starburst Dendrimers. 4. Covalently Fixed Unimolecular Assemblages Reminiscent of Spheroidal Micelles," *Macromolecules*, 1987, 20, 1164–1167.

* cited by examiner

Primary Examiner—Jill Warden
Assistant Examiner—Monique T. Cole
(74) Attorney, Agent, or Firm—Woodcock Washburn LLP

(57) ABSTRACT

A biocompatible emulsifier for forming stable emulsions is disclosed. The emulsifier is particularly useful for emulsions of biological fluids, such as artificial blood, and for emulsions as drug delivery vehicles.

12 Claims, 2 Drawing Sheets

PEG-Gen. 3

R = H, t-BOC, alkanoyl, alkyl, perfluoroacyl, fluoroalkyl, perfluoroalkyl ether

Structures of PEG-Dendrimeric-Poly(lysine) Hybrids

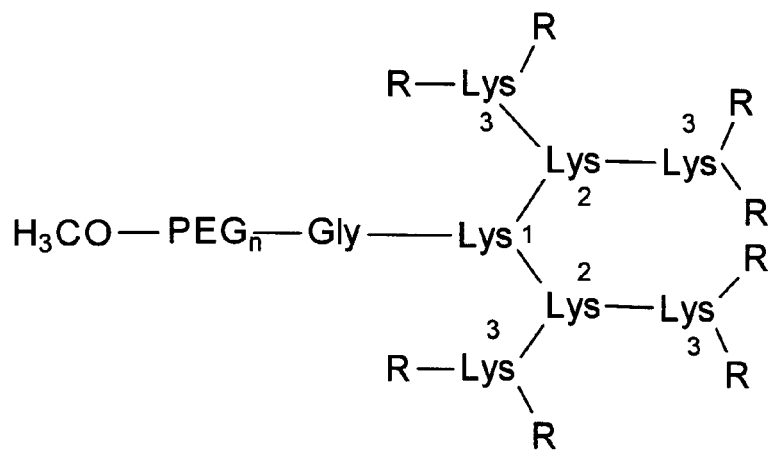
PEG-Gen. 3
R = H, t-BOC, alkanoyl, alkyl, perfluoroacyl, fluoroalkyl, perfluoroalkyl ether
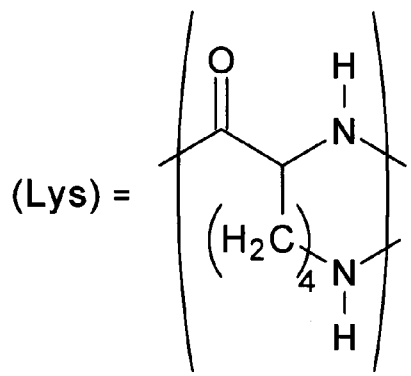
Figure 1. Structures of PEG-Dendrimeric-Poly(lysine) Hybrids

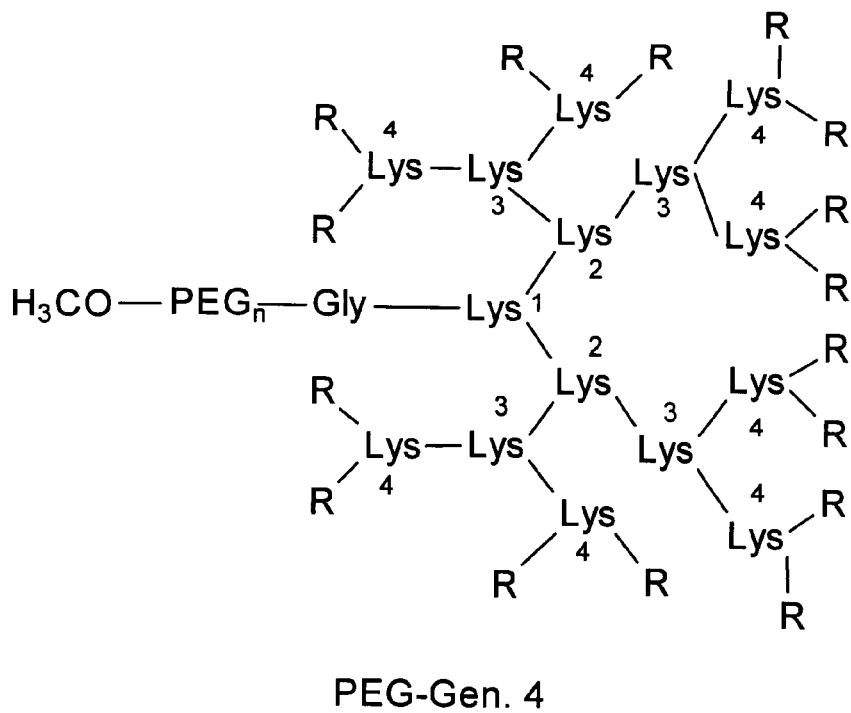
PEG-Gen. 4
R = H, t-BOC, alkanoyl, alkyl, perfluoroacyl, fluoroalkyl, perfluoroalkyl ether
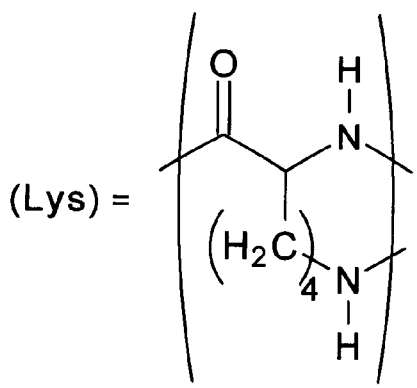
Figure 2. Structures of PEG-Dendrimeric-Poly(lysine) Hybrids

BIOCOMPATIBLE EMULSIFIER

BACKGROUND OF THE INVENTION

1. Field of the Invention

This invention relates to emulsifiers, and in particular, to biocompatible emulsifiers that can be used to create stable emulsions, such as blood substitutes or drug delivery vehicles.

2. Description of the Related Art

Emulsifiers are well-known agents, such as soaps, that promote the formation and stabilization of an emulsion. Preparation of emulsions is relatively straightforward in most instances. When, however, the emulsion is a processed food or a biological fluid, such as artificial blood, the emulsifier must not only be capable of forming and stabilizing the emulsion, but must also be non-toxic to the person or animal ingesting or receiving the emulsion internally or externally.

It has been shown that certain amphiliphilic linear polymer-dendrimer hybrids can be used as surfactants. See Chapman, et al., "Hydroamphiphiles: Novel Linear-Dendritic Blood Copolymer Surfactants," J. Am. Chem. Soc. 1994, 116, 11195–96. Surfactants, however, differ from emulsifiers, in that the former is intended to interact with water, while the later must be able to interact both with water, or an aqueous phase, and must also be able to interact with a second, typically non-aqueous, liquid phase.

There remains a need in the art for a biocompatible emulsifier useful in creating stable emulsion for use in foods, drugs, and biological fluids.

SUMMARY OF THE INVENTION

The present invention provides an emulsion of biocompatible materials, the emulsion being formed and stabilized by a polyethylene glycol-dendrimeric-poly(lysine) hybrid. The hybrid may be a first through fourth generation polymer, with generation 3 polymer being preferred.

BRIEF DESCRIPTION OF THE DRAWINGS

The accompanying drawings describe the present invention in which:

FIG. 1 is a generation 3 polymer of the present invention.

FIG. 2 is a generation 4 polymer of the present invention.

DETAILED DESCRIPTION OF THE PRESENT INVENTION

The invention uses hybrid polymers with dendritic or hyperbranched structures bonded to linear polymers to emulsify water or aqueous solutions with an immiscible phase The polymer structure of two preferred embodiments is shown in FIGS. 1 and 2. The two moieties have separate functions: one consists of or contains a hydrophilic portion, such as poly(ethylene glycol)(PEG, also referred to as polyethylene oxide or PEO) chain(s). and the other contains a hydrophobic portion, such as dendrimeric polylysine with multiple terminal amino, alky, alkanoyl, acyl, carbamoyl groups, or urea groups. The dendrimeric portion is built up in "generations" and the lysine generation numbers are indicated in the figures. For the purpose of emulsification, one of the moieties is water-soluble whereas the other is miscible with the phase to be emulsified with water. The polymer whose function is described here is a poly-L-lysine dendrimer covalently attached through a glycine residue to PEG. The polymer and its synthesis has been described in Chapman. T. M.; Hillyer, G. L.; Mahan, E. Staffer, K. A. "Hydraamphiphiles: Novel Linear-Dendritic Block Copolymer Surfactants" J. Am. Chem. Soc. 1994, 116, 11195–6, incorporated by reference herein. The PEG can have from 10 to 700 ethylene oxide residues. At the termini of the dendrimer are hydrophobic residues such as the t-BOC group, alkanoyl groups containing at least two carbons and fluorinated chains attached as amides. See Chapman, T. M.; Mahan, E. J., "Fluorinated Hydraamphiphides: Poly (ethylene oxide)-polylysine dendrimer hybrids with multiple ten perfluorooctanoyl groups" Proc. Am. Chen. Soc., Div. Polym. Mat. Sci. Eng. 1995, 73, 275–6. incorporated by reference herein. These can be perfuoroalkanoyl groups with 6 or more carbons. While these perfluorocarbon-containing termini are generally understood to have had every hydrogen in the carbon chain replaced with fluorine (i.e., all C-F bonds and no C-H bonds), as used herein the term "perfluorocarbon-containng termini" is intended to include fluorocarbons in which some of the hydrogen may remain bonded to the fluorocarbon moiety (i.e.. combinations of both C-F and C-H bonds). Other hydrophobic groups can be used, including alkyl chains of various lengths, fluoroethers, acrylates or polysiloxanes. The hydrophobic residues may, for example, be selected from the group consisting of t-Boc. alkanoyl, alkyl, pertluoroacyl, fluoroalkyl, perfluoroalkyl ether, and H.

The hydrophilic linear moieties can other than PEG, be various hydrophilic poly(amino acids), such as polyglutamic acid, polyaspartic acid, polylysine, polyornethine, polyserine or polythreonine. The bridge need only provide a stable linkage between the linear and dendrimeric units and need not be there at all, a simple ester sufficing as a link. The major components of the preferred polymer of the present invention are PEG, which is FDA approved as safe for internal consumption, and lysine, an essential amino acid. Thus the metabolites derived from hydrolysis of the polymer are safe or beneficial.

My original publications focused on the surfactant properties of certain of these materials, as they are able to lower the surface tension of water, exhibit a well defined critical micelle concentration (cmc), and when above the cmc, solubilize water insoluble compounds. I have subsequently become interested in the emulsifying activity of these and other materials, and that is the basis of this invention. I have demonstrated that the fluorinated materials described in Chapman, supra, are able to emulsify liquid CO2 in water and the t-Boc-terminated polymer is able to emulsify castor oil in water. To the best of applicant's knowledge, neither dendrimers nor dendrimer-linear polymer hybrids have, prior to the invention hereof, been reported to have emulsifying properties.

Polymers with a 5000 Mw PEG chain attached to the generation 3 and 4 poly-L-lysine dendrimers containing 8 or 16 perfluorooctanoyl termini, respectively were found to have reasonable solubility in liquid CO2 at 2000 psi. They were shown to be able to emulsify CO2 and water with the CO2 phase resembling a stable froth, stable for 30 minutes or more. The generation 3 polymer was superior to that of generation 4 polymer. Initial experiments indicate the ability to extract proteins into the CO2 phase. Since CO2 and perfluorocarbons have similar solvent properties and are completly miscible with each other, water fluorocarbon emulsions are probable. Indeed, in initial experiments, a mixture of generation-3 PEG (5000)-dendrimeric polylysine containing 8 terminal perfluorooctanoyl groups with 10% perfluoromethydecalin in water formed an emulsion with no apparent phase separation for 30–40 minutes.

Studies were carried out to test the ability of the t-Boc form of the dendrimers to emulsify castor oil in 1 mL of the buffer. Results are shown in Table 1. Generation 2 polymer with 4 t-Boc end groups gave a particle size of 143 nm, which increased to 391 nm after 24 hours. Generation 3 polymer gave a particle size of 116, which was virtually unchanged after 24 hours. Generation 4 gave a particle size of 170 nm, which was stable for at least 24 hours. Larger generation dendrimers were not effective. They also were not water-soluble. The generation 3 emulsions were stable to ten freeze-thaw cycles as well.

TABLE 1

Droplet Size for Castor Oil in Aqueous Saline Emulsions

| Generation | Amount (mg) | Droplet Size (nm) T = 0 | Droplet Size (nm) T = 24 h |
|---|---|---|---|
| 2 | 1.2 | 143.3 | 390.8 |
| 3 | 1.5 | 158.7 | 152.7 |
| | 1.2 | 115.7 | 114.3 |
| | 1.0 | 119.0 | 113.4 |
| | 0.5 | 161.0 | 156.8 |
| | 0.1 | 433.8 | 389.5 |
| 4 | 1.5 | 158.4 | 149.5 |
| | 1.2 | 169.6 | 162.2 |
| | 1.0 | 213.9 | 214.3 |
| | 0.5 | 254.8 | 245.1 |
| | 0.1 | 363.3 | 350.9 |
| 5 | 1.2 | 1444.7 | 910.6 |
| 6 | 1.2 | 2259.7 | 1773.1 |

There are numerous important applications for the dendrimeric emulsifying agents. The ability to support carbon dioxide/water emulsions could lead to new extraction techniques to concentrate materials from aqueous solution into $CO_2$ or fluorocarbon phases. This could lead to new polymerization reactions of the emulsion type, or organic transformations that cannot be carried out in water. The ability to emulsify perfluorocarbons in water makes possible applications requiring artifical blood or organ preservation. Another major interest are the possibilities of using oil emulsions for controlled drug delivery of highly hydrophobic medications. Though castor oil itself may not be an appropriate medium for drug delivery, it does serve as a good model for emulsion studies.

The expected advantages of the described polymers as emulsifying agents are that the multiple termini of the dendrimeric portion provide multiple points of interaction with the hydrophobic droplets which we believe would provide extra stabilization of the droplets. Having numerous hydrophobic termini in the same molecule would provide a symbiosis so that one droplet-terminal interaction would facilitate the second interaction and so on. The components of the polymer are either benign or natural amino acids as pointed out earlier. The amino groups at the lysine termini serve as points of attachment of almost any imaginable chemical grouping so that structures can be engineered to interact well with any non-aqueous phase. As an example, the emulsifiers used in a blood substitute such as Fluosol® include a synthetic polymer Polyoxamer and phosphatidyl lipids, neither of which has components which interact strongly with fluorocarbons. The fluorinated termini of the emulsifier of the present invention will be soluble in fluorocarbon droplets. Another advantage is the linear PEG moiety; such components are known to stabilize proteins in circulation as well as to decrease antigenicity; they stabilize vesicle lifetimes in-vivo. In this way emulsions containing the disclosed emusifiers should have enhanced circulating lifetimes for in-vivo applications.

The structures of the generations 3 and 4 polymers are shown in FIGS. 1 and 2, respectively. The generation numbers are indicated next to the lysine residues. Note that at each succeeding generation the number of terminal lysine residues doubles. The generation 1 polymer has one lysine residue attached to PEG; generation 2 had 3 lysine residues, two at the terminus: generation 5 and 6 have 16 and 32 terminal lysine residues, respectively. The synthesis of the polymers is described in the previously noted publication: Chapman, T. M; Hillyer, G.; Mahan, E. J; Shaffer, K. A. *J. Am. Chem. Soc.* 1994, 116, 11195–6, incorporated by reference herein. The appendages "R" are attached to the terminal lysine residues where R is initially hydrogen.

EXAMPLE

Emulsification of perfluoromethyldecalin (PFMD) in water. Into a one dram vial were added 0.2 mL of PFMD, 1.8 mL, and 0.0196 g of the PEG-Gen 3 with R=perfluorooctanoyl. This was put on ice and emulsified using a "Tissue Tearer" high speed mixer for five minutes. Phase separation was first observed after 55 minutes. With PEG-Gen 2, a thick bottom layer separated within 25 minutes; with PEG-Gen 4, separation to two layers was observed at 25 minutes. While the present invention has been described herein in terms of preferred embodiments, it will now be apparent to those skilled in the art that various improvements, modifications, and variations to the invention are possible. For example, other biocompatible emulsifiers, such as fatty acid salts, e.g., oleic acid and phospholipids, such as lecithins, could be employed, alone, or in combination with one or more other emulsifiers disclosed herein. All such improvements, modifications, and variations are intended to fall within the scope of the present invention, as set forth in the following claims, including all equivalents thereof to which we are entitled.

I claim:

1. A biocompatible emulsifier, having the structure:

Y—X—R wherein

Y is a hydrophilic oligomer or polymer;

X is a poly(amino acid) dendrimer or monodendron; and

R comprises hydrophobic perfluorocarbon-containing terminal moieties.

2. The emulsifier of claim 1 wherein Y has from 10 to about 700 residues.

3. The emulsifier of claim 1 wherein X is a dendrimer of up to 10 generations.

4. The emulsifier of claim 1 wherein Y is comprised of ethylene glycol, vinyl alcohol, vinyl amine, hydrophilic acrylate, hydrophilic methacrylate, or hydrophilic amino acid subunits.

5. The emulsifier of claim 1 wherein Y is comprised of poly(ethylene glycol), poly(vinyl alcohol), poly(vinyl amine), hydrophilic polyacrylate, hydrophilic polymethacrylate, or hydrophilic poly(amino acid)s.

6. The emulsifier of claim 1 wherein X is a dendrimer comprised of lysine, ornithine, glutamic acid, aspartic acid, serine, or homoserine residues.

7. A biocompatible emulsion, comprising a mixture of immiscible liquids and an emulsifier, said emulsifier having the structure:

Y—X—R wherein
Y is a hydrophilic oligomer or polymer;
X is a poly(amino acid) dendrimer or monodendron; and
R comprises hydrophobic perfluorocarbon-containing terminal moieties.

8. The emulsion of claim 7 wherein Y has from 10 to about 700 residues.

9. The emulsion of claim 7 wherein X is a dendrimer of up to 10 generations.

10. The emulsion of claim 7 wherein Y is comprised of ethylene glycol, vinyl alcohol, vinyl amine, hydrophilic acrylate, hydrophilic methacrylate, or hydrophilic amino acid subunits.

11. The emulsion of claim 7 wherein Y is comprised of poly(ethylene glycol), poly(vinyl alcohol), poly(vinyl amine), hydrophilic polyacrylate, hydrophilic polymethacrylate, or hydrophilic poly(amino acid)s.

12. The emulsion of claim 7 wherein X is a dendrimer comprised of lysine, ornithine, glutamic acid, aspartic acid, serine, or homoserine residues.

* * * * *